US012191612B2

(12) United States Patent
Oosaka

(10) Patent No.: US 12,191,612 B2
(45) Date of Patent: Jan. 7, 2025

(54) CONNECTOR AND FORMING METHOD OF CONNECTOR

(71) Applicant: Japan Aviation Electronics Industry, Limited, Tokyo (JP)

(72) Inventor: Junji Oosaka, Tokyo (JP)

(73) Assignee: Japan Aviation Electronics Industry, Limited, Tokyo (JP)

(*) Notice: Subject to any disclaimer, the term of this patent is extended or adjusted under 35 U.S.C. 154(b) by 416 days.

(21) Appl. No.: 17/717,273

(22) Filed: Apr. 11, 2022

(65) Prior Publication Data

US 2022/0385005 A1 Dec. 1, 2022

(30) Foreign Application Priority Data

May 28, 2021 (JP) ................................ 2021-089682

(51) Int. Cl.

| | |
|---|---|
| ***H01R 13/74*** | (2006.01) |
| ***H01R 4/02*** | (2006.01) |
| ***H01R 13/405*** | (2006.01) |
| ***H01R 13/447*** | (2006.01) |
| ***H01R 43/16*** | (2006.01) |
| ***H01R 43/24*** | (2006.01) |

(52) U.S. Cl.

CPC ........... *H01R 13/748* (2013.01); *H01R 4/023* (2013.01); *H01R 13/405* (2013.01); *H01R 13/447* (2013.01); *H01R 43/16* (2013.01); *H01R 43/24* (2013.01)

(58) Field of Classification Search

CPC .. H01R 13/748; H01R 13/405; H01R 13/447; H01R 13/16; H01R 4/023; H01R 43/24

USPC .......................................................... 439/430

See application file for complete search history.

(56) References Cited

U.S. PATENT DOCUMENTS 6,491,552 B2 12/2002 Horikoshi et al.
6,579,125 B1 6/2003 Nagahata et al.
(Continued)

FOREIGN PATENT DOCUMENTS

CN 102035090 A 4/2011
CN 102035090 B 4/2013
(Continued)

OTHER PUBLICATIONS

Taiwan IPO Examination Report in Taiwan Patent Application No. 111114815 issued Mar. 7, 2023, with an English translation thereof.

*Primary Examiner* — Peter G Leigh
(74) *Attorney, Agent, or Firm* — Collard & Roe, P.C.

(57) ABSTRACT

A connector comprises an insert-molded body. The insert-molded body comprises a housing and a terminal partially embedded in the housing. The housing has a main portion. The main portion is formed with a trace hole and an accommodation space. The terminal has a held portion, a bent-back portion extending forward from the held portion, a support portion extending rearward from the bent-back portion and a contact portion supported by the support portion. The held portion has a wide portion. When the insert-molded body is seen from above, the wide portion is, at least in part, visible through the trace hole. Each of the support portion and the contact portion has a size smaller than that of the wide portion in the lateral direction. The wide portion is partially visible through the accommodation space when the insert-molded body is seen from below.

9 Claims, 9 Drawing Sheets

(56) References Cited

U.S. PATENT DOCUMENTS

| | | | | |
|---|---|---|---|---|
| 6,843,657 | B2 | 1/2005 | Driscoll et al. | |
| 6,855,013 | B2 * | 2/2005 | Chiang | H01R 12/7076 439/736 |
| 6,910,897 | B2 | 6/2005 | Driscoll et al. | |
| 7,019,984 | B2 | 3/2006 | Driscoll et al. | |
| 7,056,128 | B2 | 6/2006 | Driscoll et al. | |
| 7,273,390 | B2 * | 9/2007 | Iida | H01R 12/712 439/494 |
| 7,281,930 | B1 * | 10/2007 | Chen | H01R 12/57 439/79 |
| 7,430,801 | B2 * | 10/2008 | Iida | H01R 12/79 439/494 |
| 7,438,561 | B2 * | 10/2008 | Chen | H01R 12/721 439/79 |
| 7,942,698 | B2 * | 5/2011 | Nanao | H01R 12/722 439/607.31 |
| 8,033,870 | B2 * | 10/2011 | Xie | H01R 12/57 439/660 |
| 11,271,354 | B2 | 3/2022 | Sakoda et al. | |
| 2002/0019179 | A1 * | 2/2002 | Masumoto | H01R 13/2442 439/862 |
| 2002/0042212 | A1 * | 4/2002 | Michaud | G06K 7/0021 439/66 |
| 2005/0130499 | A1 * | 6/2005 | Zheng | H01R 13/422 439/630 |

FOREIGN PATENT DOCUMENTS

| | | | | | |
|---|---|---|---|---|---|
| CN | 111837296 | A | | 10/2020 | |
| EP | 917253 | A1 | * | 5/1999 | G06K 7/0021 |
| EP | 1265317 | A2 | * | 12/2002 | H01R 13/2442 |
| EP | 1722448 | A1 | * | 11/2006 | H01R 12/598 |
| JP | 2001-307799 | A | | 11/2001 | |
| JP | 2002-313498 | A | | 10/2002 | |
| JP | 2003-217712 | A | | 7/2003 | |
| JP | 2004-127611 | A | | 4/2004 | |
| JP | 2011108561 | A | * | 6/2011 | |
| JP | 2014-220050 | A | | 11/2014 | |
| WO | WO-0068867 | A1 | * | 11/2000 | G06K 7/0021 |
| WO | 2004093263 | A1 | | 10/2004 | |
| WO | 2009001436 | A1 | | 12/2008 | |

* cited by examiner

CONNECTOR AND FORMING METHOD OF CONNECTOR

CROSS REFERENCE TO RELATED APPLICATIONS

This application is based on and claims priority under 35 U.S.C. § 119 to Japanese Patent Application No. JP 2021-089682 filed May 28, 2021, the content of which is incorporated herein in its entirety by reference.

BACKGROUND OF THE INVENTION

This invention relates to a connector which is configured to be pressed against an object to be connected to the object.

For example, this type of connector is disclosed in JPA 2001-307799 (Patent Document 1), the content of which is incorporated herein by reference.

Referring to FIG. 16, Patent Document 1 discloses an electronic device comprising a connector 90. The connector 90 comprises a housing 92 made of resin and a terminal 94. The terminal 94 is partially engaged with an inner wall of the housing 92 to be attached to the housing 92. The terminal 94 has a connection portion 942 and a contact portion 944. The connection portion 942 is fixed to a lead wire 96. The contact portion 944 is located outside the housing 92 and is resiliently deformable. When the connector 90 is pressed against a board 98, the contact portion 944 is brought into contact with a land 984 of the board 98 while being resiliently deformed. Thus, the connector 90 of Patent Document 1 is a connector which is configured to be pressed against an object (board 98) to be connected to the object.

A connector such as that of Patent Document 1 can be easily connected to an object such as a board. However, when this type of connector is used to transmit high-frequency signals, its terminals should be extremely accurately positioned relative to its housing. According to the attaching method of the terminal of Patent Document 1, positional accuracy of the terminal relative to the housing might be degraded. When accuracy of positional relation between the terminal and the housing is insufficient, high-frequency characteristics of the terminal might vary, and thereby designed characteristics could not be obtained.

SUMMARY OF THE INVENTION

It is therefore an object of the present invention to provide a connector having a structure which can improve accuracy of positional relation between its terminal and its housing.

An aspect of the present invention provides a forming method of a connector configured to be pressed against an object to be connected to the object. The forming method comprises a terminal forming step, an arranging step and a molding step. In the terminal forming step, a terminal is formed. The terminal has a held portion, a bent-back portion, a support portion and a contact portion. The held portion extends in a front-rear direction. The held portion has a wide portion. The bent-back portion extends forward from the held portion. The support portion extends rearward from the bent-back portion and is resiliently deformable. The contact portion is supported by the support portion. The support portion and the contact portion are located under the held portion in an upper-lower direction perpendicular to the front-rear direction. Each of the support portion and the contact portion has a size smaller than that of the wide portion in a lateral direction perpendicular to both the front-rear direction and the upper-lower direction. The wide portion has opposite sides in the lateral direction each of which protrudes beyond the support portion in the lateral direction when the terminal is seen from below. In the arranging step, the terminal is arranged in a die. The die includes an upper die and a lower die. The upper die is pressed against an upper surface of the wide portion of the held portion. The lower die is pressed against lower surfaces of the opposite sides of the wide portion of the held portion. The die is formed with a closed space located therein. The support portion and the contact portion are arranged in the closed space. In the molding step, a housing is molded of resin which is put into the die while the terminal is insert-molded in the housing. The resin is not put into the closed space.

Another aspect of the present invention provides a connector configured to be pressed against an object to be connected to the object. The connector comprises an insert-molded body. The insert-molded body comprises a housing made of resin and a terminal. The terminal is partially embedded in the housing. The housing has a main portion. The main portion has an upper surface and a lower surface in an upper-lower direction. The lower surface of the main portion faces the object when the connector is connected to the object. The main portion is formed with a trace hole and an accommodation space. The trace hole extends downward from the upper surface of the main portion. The accommodation space is recessed upward from the lower surface of the main portion. The terminal has a held portion, a bent-back portion, a support portion and a contact portion. The held portion extends in a front-rear direction perpendicular to the upper-lower direction and is held by the housing so as to face, at least in part, the accommodation space. The held portion has a wide portion. When the insert-molded body is seen from above, the wide portion is, at least in part, visible through the trace hole. The bent-back portion extends forward from the held portion. The support portion extends rearward from the bent-back portion and is resiliently deformable. The contact portion is supported by the support portion. The support portion and the contact portion are located under the held portion. Each of the support portion and the contact portion has a size smaller than that of the wide portion in a lateral direction perpendicular to both the front-rear direction and the upper-lower direction. The support portion is partially accommodated in the accommodation space. The wide portion has opposite sides in the lateral direction each of which protrudes beyond the support portion in the lateral direction. The wide portion is partially visible through the accommodation space when the insert-molded body is seen from below.

The terminal of an aspect of the present invention is insert-molded and partially embedded in the housing made of resin. By fixing the terminal to the housing as described above, variation of positional relation between the housing and the terminal can be reduced.

When a spring length of the support portion of the terminal is made long in order to improve spring characteristics, the held portion tends to be long. Such a long held portion is plastically deformed easily when the terminal is insert-molded into the housing. As a result of the plastic deformation, positional relation between the housing and the terminal will be changed. However, the held portion of an aspect of the invention has the wide portion which protrudes beyond the support portion in opposite orientations in the lateral direction. When the terminal is insert-molded into the housing, the plastic deformation of the held portion can be reduced by vertically sandwiching and pressing the wide portion. Thus, the present invention provides a connector having a structure which can improve accuracy of positional relation between its terminal and its housing.

An appreciation of the objectives of the present invention and a more complete understanding of its structure may be had by studying the following description of the preferred embodiment and by referring to the accompanying drawings.

Figure 1:
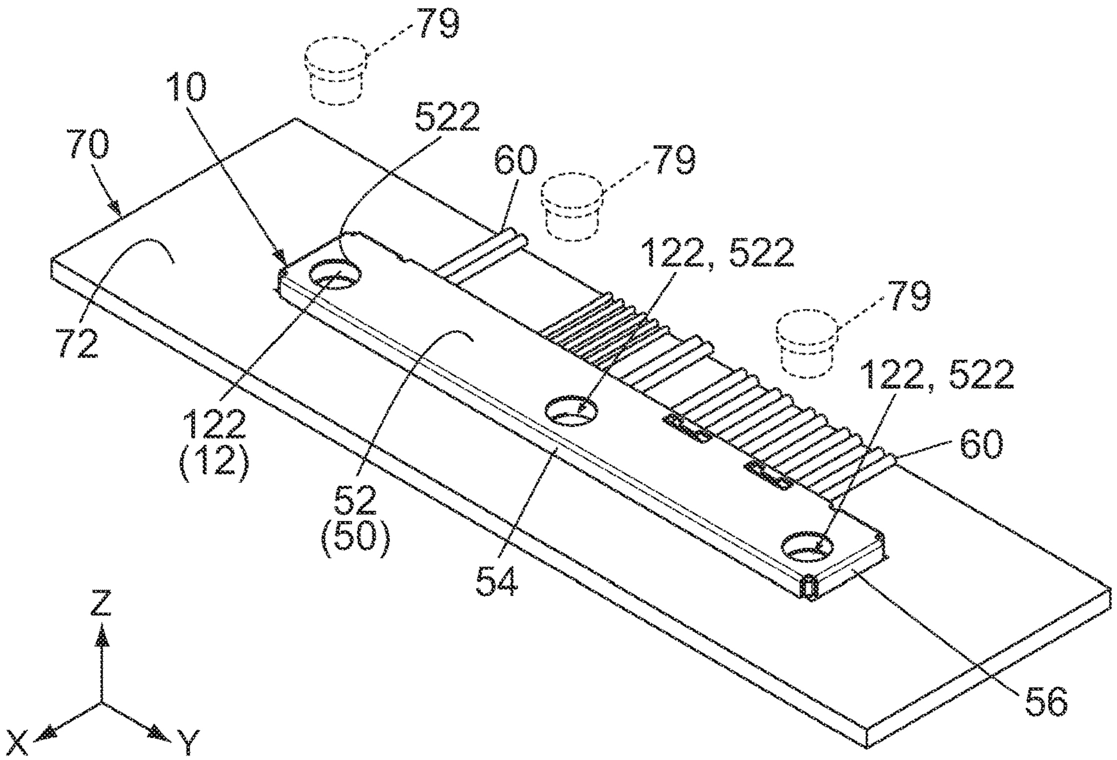
FIG. 1 is a perspective view showing a connector according to an embodiment of the present invention, wherein the connector is connected to cables and is connected to a circuit board, and outlines of screws for fixing the connector to the circuit board are illustrated with dashed line.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Referring to FIG. 1, a connector 10 according to an embodiment of the present invention is a so-called one-piece connector. The connector 10 can be formed of a small number of components in comparison with a so-called two-piece connector which comprises a plug and a receptacle.

More specifically, the connector 10 of the present embodiment is a so-called compression type connector which is configured to be pressed against an object 70 to be connected to the object 70. The connector 10 of the present embodiment is connectable to a circuit board 70 which is the object 70. However, the object 70 of the connector 10 of the present invention is not limited to the circuit board 70.

Figure 2:
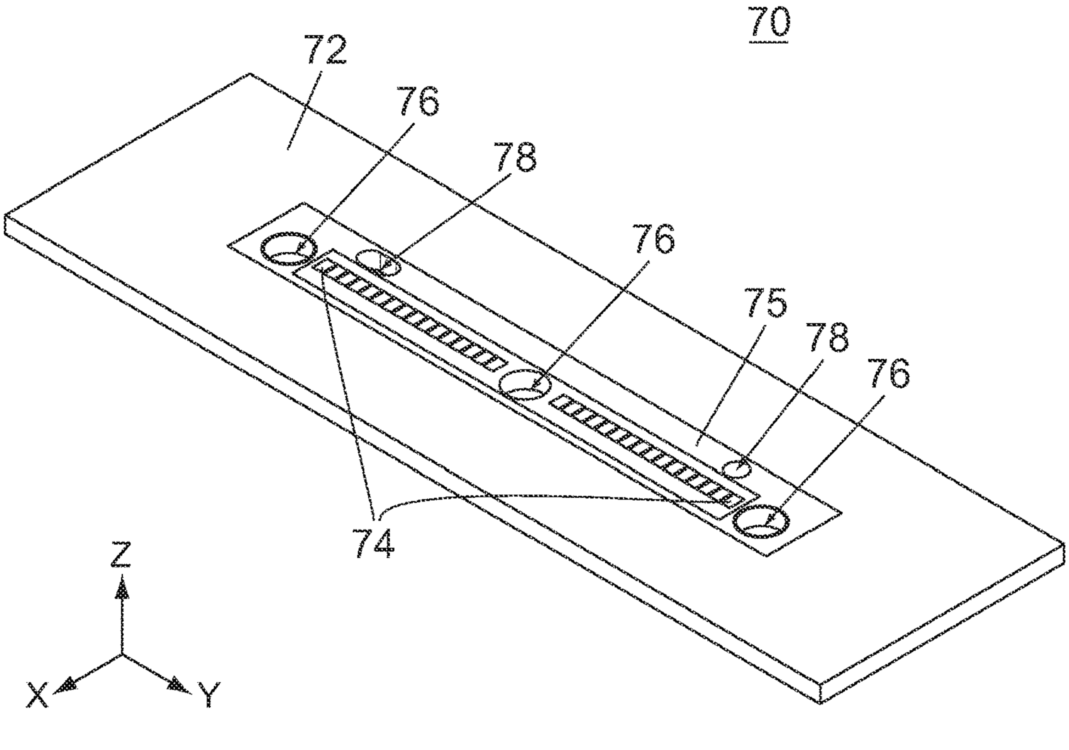
FIG. 2 is a perspective view showing the circuit board of FIG. 1.

As shown in FIG. 2, the object (circuit board) 70 of the present embodiment has an upper surface 72 in an upper-lower direction. The upper-lower direction of the present embodiment is the Z-direction. “Upward” means the positive Z-direction. “Downward” means the negative Z-direction. The upper surface 72 is a surface on which the connector 10 (see FIG. 1) is pressed and connected. The upper surface 72 extends along a horizontal plane (XY-plane) perpendicular to the upper-lower direction.

The upper surface 72 is formed with a plurality of conductive pads 74 each made of conductor and a ground pattern 75 made of conductor. The conductive pads 74 are arranged in a lateral direction perpendicular to the upper-lower direction. The lateral direction of the present embodiment is the Y-direction. Each of the conductive pads 74 is a member for electrically connecting the connector 10 thereto. The ground pattern 75 seamlessly surrounds all the conductive pads 74 in the XY-plane. The ground pattern 75 is a member for grounding the connector 10 thereto.

The object 70 is formed with two positioning holes 78 and three screw holes 76. The positioning holes 78 are arranged in the lateral direction. Each of the screw holes 76 is formed with a female screw (not shown). The screw holes 76 are arranged in the lateral direction. Referring to FIG. 2 together with FIG. 1, the positioning holes 78 are portions for positioning the connector 10 to the object 70. The screw holes 76 are portions for fixing the connector 10 to the object 70 by using screws 79.

The object 70 of the present embodiment has the aforementioned structure. However, the structure of the object 70 of the present invention is not specifically limited, provided that the connector 10 is electrically connectable with the object 70.

Referring to FIG. 1, the connector 10 of the present embodiment is connectable to a plurality of cables 60. Thus, the connector 10 is a so-called cable connector. The connector 10 forms a harness together with the cables 60. However, the present invention is not limited thereto. For example, the connector 10 may be connectable to a mating connector (not shown) instead of the cables 60. The number of the cables 60 connected to the connector 10 may be one.

The cables 60 of the present embodiment are arranged in the lateral direction to form one cable row. Each of the illustrated cables 60 extends along a front-rear direction perpendicular to both the upper-lower direction and the lateral direction. The front-rear direction of the present embodiment is the X-direction. “Forward” means the positive X-direction. “Rearward” means the negative X-direction. For each of the cables 60, one of opposite ends is connected to the connector 10, and a remaining one of the opposite ends is connected to an electronic device (not shown). When the connector 10 is connected to the object 70, the electronic device is electrically connected with a mating electronic device (not shown) in which the object 70 is incorporated.

Figure 4:
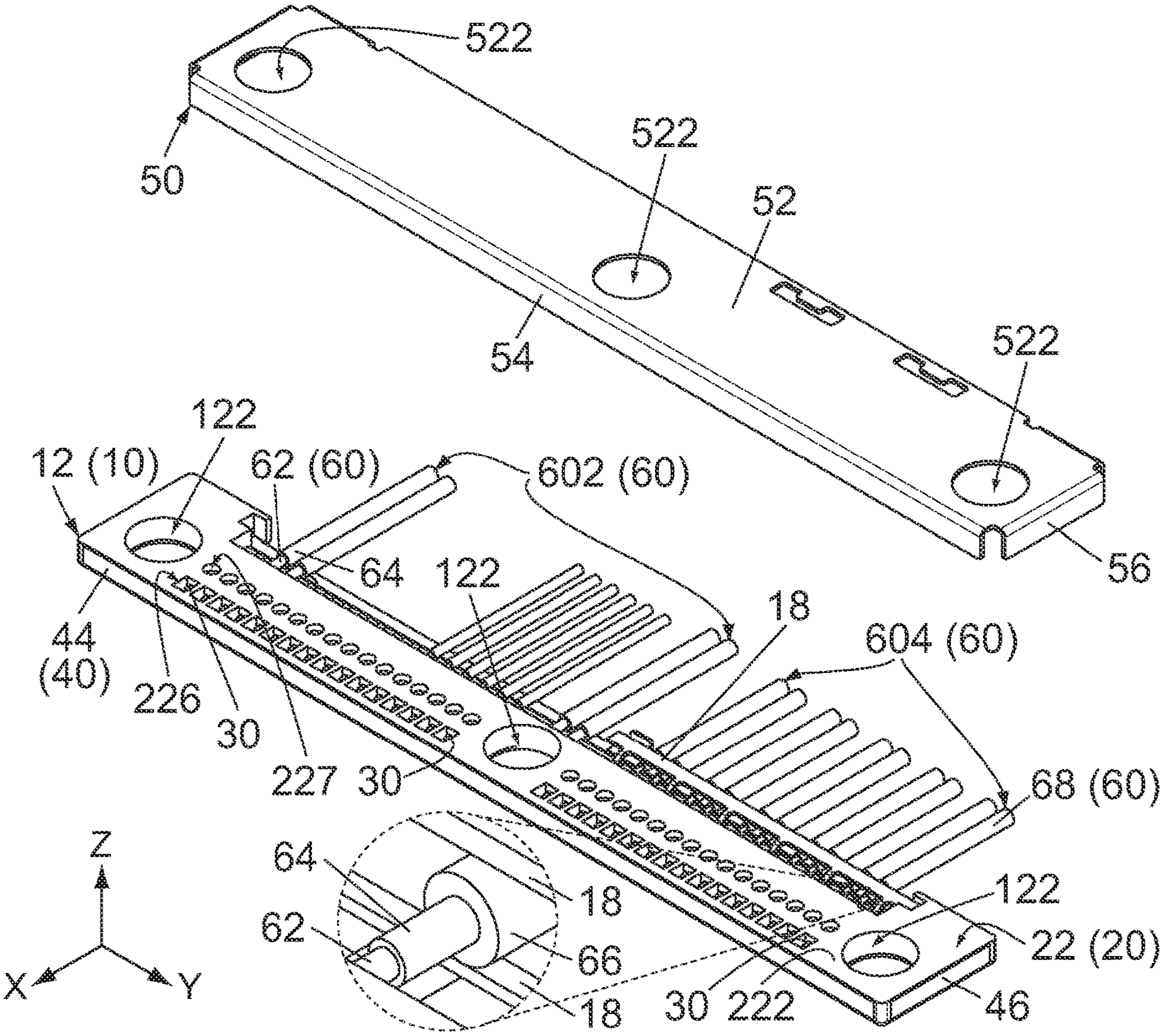
FIG. 4 is an exploded, perspective view showing the connector of FIG. 3, wherein a part of the connector enclosed by dashed line is enlarged and illustrated.

Referring to FIG. 4, the cables 60 of the present embodiment include a plurality of first cables 602 each of which is a discrete cable and a plurality of second cables 604 each of which is a coaxial cable. The first cables 602 are arranged on one of opposite sides, or the negative Y-side, of the cable row in the lateral direction. The second cables 604 are arranged on a remaining one of the opposite sides, or the positive Y-side, of the cable row in the lateral direction.

Each of the first cables 602 and the second cables 604 of the present embodiment comprises a core wire 62 made of conductor and a wire insulation 64 made of insulator. The wire insulation 64 covers the core wire 62. The core wire 62 of a front end of the cable 60 is exposed from the wire insulation 64. Each of the first cables 602 comprises only the core wire 62 and the wire insulation 64. Each of the second cables 604 comprises a shield 66 made of conductor and an outer insulation 68 made of insulator in addition to the core wire 62 and the wire insulation 64. Each of the shields 66 has a part which is located rearward of the exposed core wire 62 and is exposed from the outer insulation 68.

The second cables 604 of the present embodiment are suitable for transmitting high-frequency signals. Thus, the connector 10 of the present embodiment is a multi-core coaxial connector which can transmit high-frequency signals. However, the structure of each of the cables 60 of the present invention is not specifically limited, provided that each of the cables 60 is electrically connectable with the connector 10. For example, all the cables 60 may have structures same as each other. The cables 60 may include only the first cables 602. Instead, the cables 60 may include only the second cables 604.

The connector 10 of the present embodiment comprises an insert-molded body 12, a cover 50 made of metal and two ground plates 18 each made of metal. The insert-molded body 12 of the present embodiment comprises a housing 20 made of resin, a plurality of terminals 30 each made of metal and an insert-shell 40 made of metal. In other words, the connector 10 comprises the housing 20, the terminals 30 and the insert-shell 40 in addition to the cover 50 and the ground plates 18.

Figure 6:
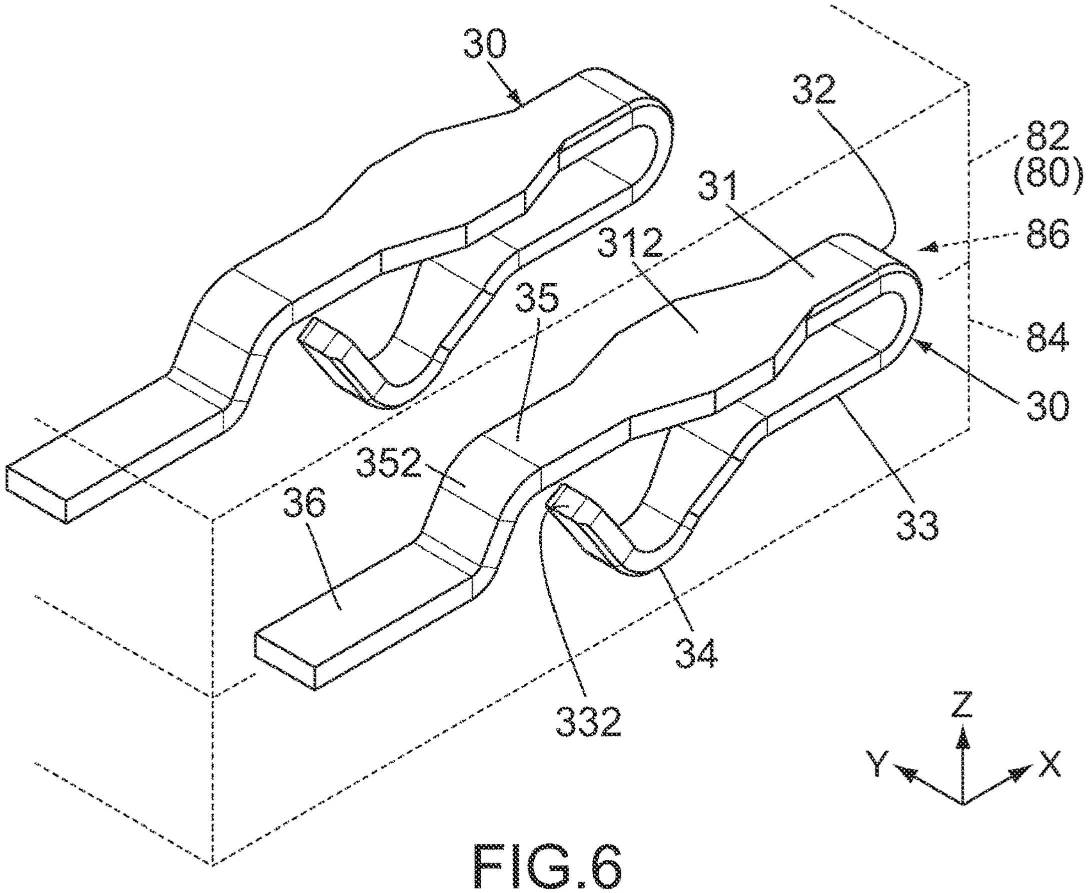
FIG. 6 is a perspective view showing two of terminals of the connector of FIG. 4, wherein an outline of a part of a die is illustrated with dashed line.

Referring to FIG. 6, the terminals 30 have shapes same as each other.

Figure 3:
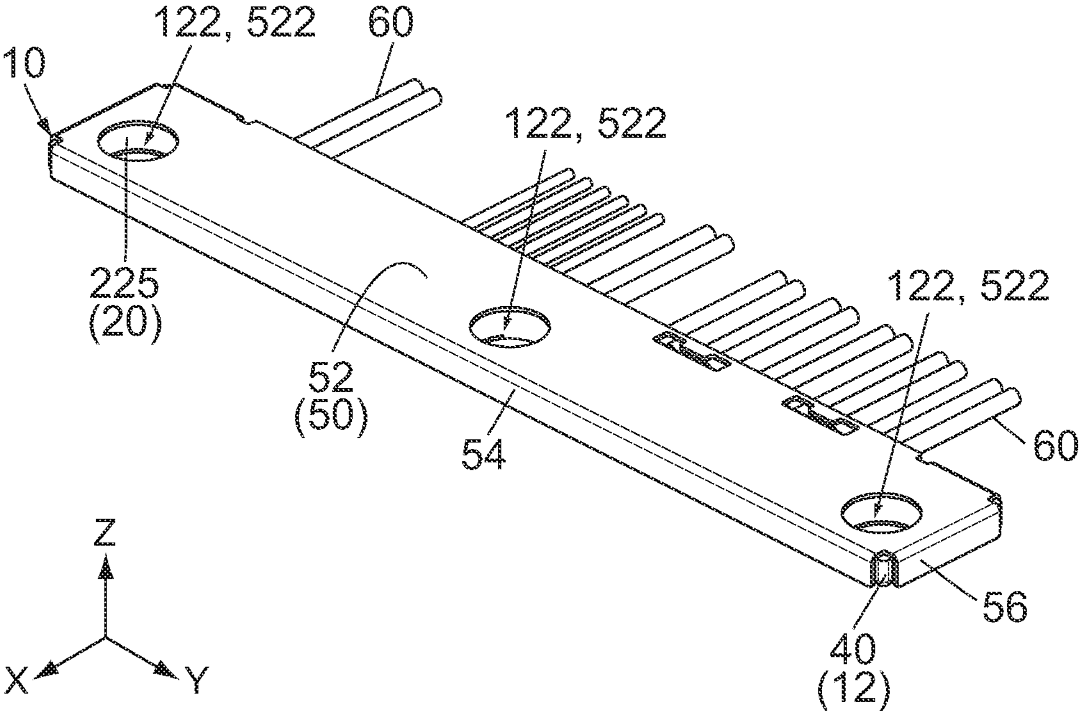
FIG. 3 is a perspective view showing the connector of FIG. 1.

Referring to FIGS. 3 and 4, the terminals 30 are arranged in the lateral direction and are held by the housing 20. The cover 50 and the insert-shell 40 sandwich the housing 20 in the upper-lower direction. Referring to FIG. 4 together with FIG. 2, the terminals 30 are provided so as to correspond to the conductive pads 74 of the object 70, respectively. Referring to FIG. 4, each of the terminals 30 is connectable to the cable 60.

The connector 10 of the present embodiment comprises the aforementioned members. However, the present invention is not limited thereto. For example, the terminals 30 may have shapes different from each other. The number of the terminals 30 may be one. The cover 50, the ground plates 18 and the insert-shell 40 may be provided as necessary. Instead, the connector 10 may further comprise another member in addition to the aforementioned members.

Hereafter, explanation will be made about a forming method of the connector 10 of the present embodiment, in particular, a forming method of the insert-molded body 12.

Figure 5:
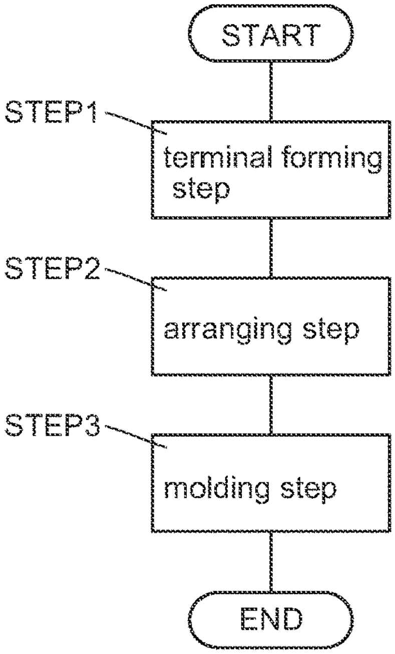
FIG. 5 is a flowchart showing an example of a forming method of the connector of FIG. 1, wherein the flowchart shows steps which are performed until an insert-molded body of the connector has been formed.

Referring to FIG. 5 together with FIG. 4, the insert-molded body 12 of the present embodiment can be manufactured via three steps consisting of a terminal forming step (step 1), an arranging step (step 2) and a molding step (step 3). However, the present invention is not limited thereto. For example, the forming method of the insert-molded body 12 can be modified as necessary.

Referring to FIG. 6, in the terminal forming step (see FIG. 5) of the present embodiment, the terminals 30 are formed. Although only two of the terminals 30 are illustrated in FIG. 6, according to the terminal forming step of the present embodiment, a large number of the terminals 30 having shapes same as each other is formed in accordance with the number of the terminals 30 necessary for the connector 10 (see FIG. 4).

Each of the terminals 30 of the present embodiment is formed by bending a single metal. In other words, each of the terminals 30 is a single metal plate with bends. Each of the terminals 30 of the present embodiment has a held portion 31, a bent-back portion 32, a support portion 33, a contact portion 34, an embedded portion 35 and a solderable portion 36. However, the present invention is not limited thereto. For example, the embedded portion 35 and the solderable portion 36 of each of the terminals 30 may be formed as necessary. Each of the terminals 30 may be formed of a plurality of metal plates which are combined to each other.

Hereafter, explanation will be made about one of the terminals 30 formed in the terminal forming step (see FIG. 5). The explanation described below is applicable to each of the terminals 30 of the present embodiment.

Figure 7:
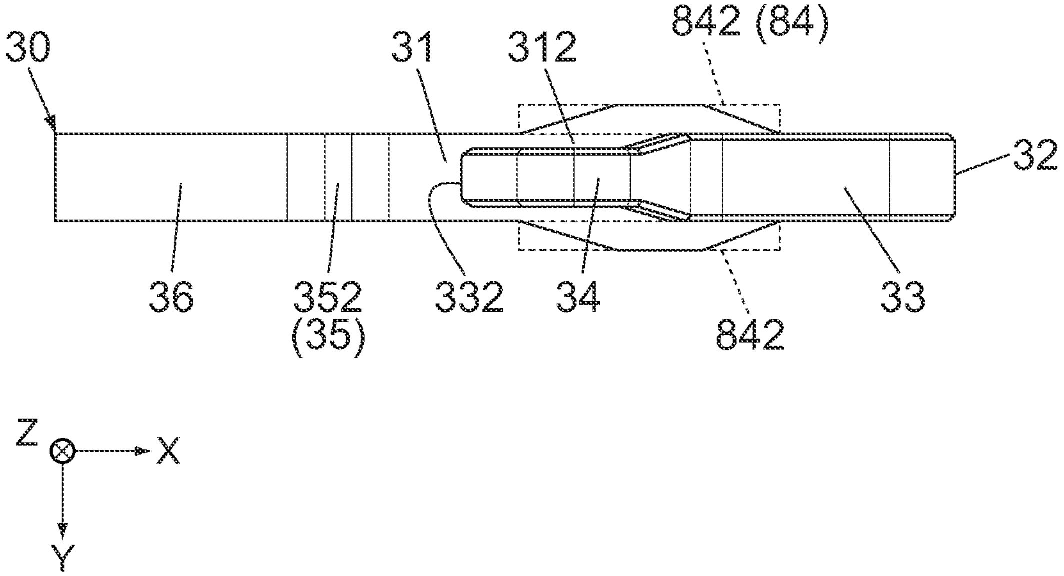
FIG. 7 is a bottom view showing one of the terminals of FIG. 6, wherein an outline of a part of a lower die is illustrated with dashed line.
Figure 8:
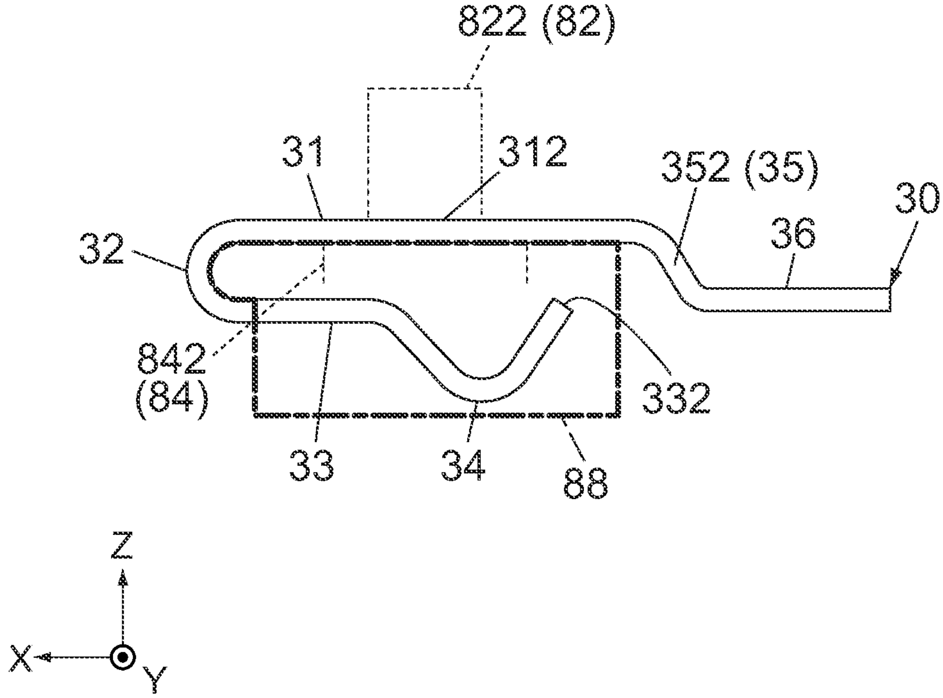
FIG. 8 is a side view showing one of the terminals of FIG. 6, wherein an outline of a part of an upper die and an outline of a part of the lower die are illustrated with dashed line, and an outline of a closed space formed in the die is illustrated with chain dotted lines.

Referring to FIGS. 6 to 8, the held portion 31 of the terminal 30 extends along the front-rear direction. The held portion 31 of the present embodiment extends straight along the front-rear direction. However, the present invention is not limited thereto. For example, the held portion 31 may be oblique to the upper-lower direction by an angle about 90 degree while extending along the front-rear direction.

The held portion 31 has a wide portion 312. The wide portion 312 is a part of the held portion 31 and extends along the front-rear direction while protruding in opposite orientations in the lateral direction. The wide portion 312 of the present embodiment is located at the middle of the held portion 31 in the front-rear direction. However, the present invention is not limited thereto, but a position of the wide portion 312 in the front-rear direction can be modified as necessary.

The bent-back portion 32 extends forward from a front end of the held portion 31. In detail, the bent-back portion 32 of the present embodiment has a half circular shape which protrudes forward in a vertical plane perpendicular to the lateral direction. The bent-back portion 32 extends forward and downward in an arc from the held portion 31 and then extends rearward and downward in an arc. The thus-formed bent-back portion 32 has an upper end and a lower end. The upper end of the bent-back portion 32 is connected to the front end of the held portion 31. However, the present invention is not limited thereto. For example, the structure of the bent-back portion 32 can be modified as necessary.

The support portion 33 extends rearward from the lower end of the bent-back portion 32 and is resiliently deformable. The contact portion 34 is supported by the support portion 33 and is movable in the upper-lower direction in accordance with resilient deformation of the support portion 33. The support portion 33 of the present embodiment extends rearward, then extends rearward while sloping downward and then extends rearward while sloping upward. The contact portion 34 of the present embodiment is located at a lower end of the support portion 33. This structure enables a spring length of the support portion 33 to be long and enables a movement range of the contact portion 34 to be large in the upper-lower direction. The support portion 33 of the present embodiment has an end 332. The end 332 of the support portion 33 is a free end. The thus-formed support portion 33 of the present embodiment is a cantilever and is easily bent. However, the structure of the support portion 33 of the present invention is not limited to that of the present embodiment but can be modified as necessary.

The support portion 33 and the contact portion 34 are located under the held portion 31. Referring to FIG. 7, each of the support portion 33 and the contact portion 34 has a size smaller than that of the wide portion 312 of the held portion 31 in the lateral direction. When the terminal 30 is seen from above, the support portion 33 including the contact portion 34 is covered by the held portion 31 and is invisible. Thus, the support portion 33 and the contact portion 34 of the present embodiment are located just under the held portion 31 and are entirely covered from above by the held portion 31. Moreover, when the terminal 30 is seen from below, the wide portion 312 protrudes beyond the support portion 33 in opposite orientations in the lateral direction.

Referring to FIGS. 6 to 8, the embedded portion 35 of the present embodiment extends rearward from a rear end of the held portion 31. The solderable portion 36 of the present embodiment extends rearward from a rear end of the embedded portion 35. Thus, the embedded portion 35 is located between the solderable portion 36 and the held portion 31 in the front-rear direction. The solderable portion 36 extends straight along the front-rear direction. The embedded portion 35 has a bent portion 352. The bent portion 352 extends rearward while sloping downward. Each of the embedded portion 35 and the solderable portion 36 of the present embodiment has the aforementioned structure. However, the present invention is not limited thereto, but the structure of each of the embedded portion 35 and the solderable portion 36 can be modified as necessary.

Summarizing the explanation described above, the forming method of the connector 10 of the present embodiment comprises the terminal forming step (see FIG. 5), or forming the terminal 30, the terminal 30 having the held portion 31, the bent-back portion 32, the support portion 33 and the contact portion 34, the held portion 31 extending in the front-rear direction, the held portion 31 having the wide portion 312, the bent-back portion 32 extending forward from the held portion 31, the support portion 33 extending rearward from the bent-back portion 32 and being resiliently deformable, the contact portion 34 being supported by the support portion 33, the support portion 33 and the contact portion 34 being located under the held portion 31 in the upper-lower direction, each of the support portion 33 and the contact portion 34 having a size smaller than that of the wide portion 312 in the lateral direction, the wide portion 312 having opposite sides in the lateral direction each of which protrudes beyond the support portion 33 in the lateral direction when the terminal 30 is seen from below.

Referring to FIG. 6, in the arranging step (see FIG. 5) of the present embodiment, the terminals 30 are arranged in a die 80. The die 80 comprises an upper die 82 and a lower die 84. The upper die 82 is located above the lower die 84. After the terminals 30 are partially arranged in the lower die 84, a lower surface of the upper die 82 is pressed against an upper surface of the lower die 84 so that the upper die 82 and the lower die 84 are combined to each other.

Referring to FIGS. 6 and 8, when the upper die 82 and the lower die 84 are combined to each other, the die 80 is formed with a cavity 86 and closed spaces 88 located therewithin. Each of the closed spaces 88 is a space which is shut off from the cavity 86. The support portion 33 and the contact portion 34 of each of the terminals 30 are accommodated in the closed space 88. For each of the terminals 30, a surface of the bent-back portion 32 which faces rearward is located in the closed space 88. Meanwhile, the other portions of the terminals 30 are pressed against the die 80 or are located in the cavity 86.

Referring to FIG. 6, according to the arranging step (see FIG. 5) of the present embodiment, two or more of the terminals 30 of the connector 10 (see FIG. 4) are arranged in the lateral direction and are placed in the die 80 which is formed by combining the one upper die 82 and the one lower die 84 to each other. The thus-combined die 80 is formed with two or more of the closed spaces 88 which correspond to the terminals 30, respectively, and the single cavity 86 which partially accommodates all the terminals 30. However, the present invention is not limited thereto. For example, when the number of the terminals 30 of the connector 10 is one, the die 80 may be formed with the single closed space 88 which corresponds to the terminal 30 and the single cavity 86 which partially accommodates the terminal 30.

The die 80 of the present embodiment comprises only two dies, or the upper die 82 and the lower die 84. Each of the closed spaces 88 of the present embodiment is enclosed only by the lower die 84 and the corresponding terminal 30. In detail, each of the closed spaces 88 is partially enclosed by the held portion 31 and the bent-back portion 32 of the corresponding terminal 30 and is partially enclosed by the lower die 84. However, the present invention is not limited thereto. For example, the die 80 may further comprise an additional die in addition to the upper die 82 and the lower die 84. Each of the closed spaces 88 may be partially enclosed by the upper die 82 or the additional die.

Referring to FIGS. 6 to 8, when each of the terminals 30 is arranged in the die 80, an upper surface of the wide portion 312 of the held portion 31 is pushed downward by the upper die 82, and a lower surface of the wide portion 312 is pushed upward by the lower die 84. In detail, the upper die 82 of the present embodiment has an upper pressing portion 822 which corresponds to the terminal 30. The upper pressing portion 822 presses downward a part of the upper surface of the wide portion 312 which is located at the middle of wide portion 312 in the lateral direction. The lower die 84 of the present embodiment has two lower pressing portions 842 which correspond to the terminal 30. The lower pressing portions 842 press upward two parts of the lower surfaces of the wide portion 312 which are located on the opposite sides of the wide portion 312 in the lateral direction. However, the present invention is not limited thereto. For example, the structure of the die 80 is not specifically limited, provided that the wide portion 312 is sandwiched and held so as to be unmovable in the upper-lower direction.

Summarizing the explanation described above, the forming method of the connector 10 of the present embodiment comprises the arranging step, or arranging the terminal 30 in the die 80, the die 80 including the upper die 82 and the lower die 84, the upper die 82 being pressed against the upper surface of the wide portion 312 of the held portion 31, the lower die 84 being pressed against the lower surfaces of the opposite sides of the wide portion 312, the die 80 being formed with the closed space 88 located therein, the support portion 33 and the contact portion 34 being arranged in the closed space 88.

Figure 11:
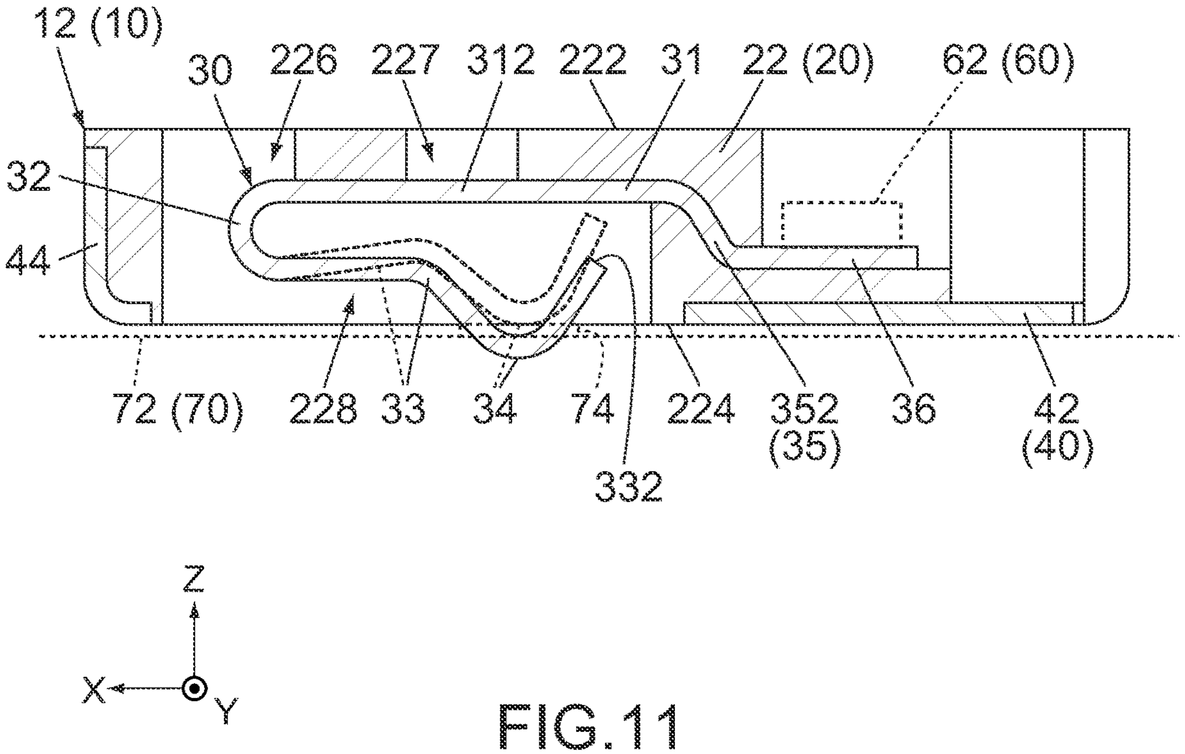
FIG. 11 is a cross-sectional view showing the insert-molded body of FIG. 10, taken along line XI-XI, wherein an outline of a resiliently deformed support portion of the terminal, an outline of a part of the circuit board and an outline of a core wire of the cable are illustrated with dashed line.

Referring to FIG. 6 together with FIG. 11, in the molding step (see FIG. 5) of the present embodiment, thermosetting resin is injected into the cavity 86 of the die 80 through an injection hole (not shown) formed in the die 80, and thereafter the resin is hardened. The hardened resin forms the housing 20. When the housing 20 has been formed, each of the terminals 30 is partially embedded in the housing 20. In detail, a part of each of the terminals 30 which is located in the cavity 86 is embedded in the hardened resin, i.e., the housing 20. Referring to FIG. 8 together with FIG. 11, the injected resin is not put into the closed spaces 88 which are shut off from the cavity 86. Therefore, the support portion 33 and the contact portion 34 of each of the terminals 30 are exposed from the housing 20.

Summarizing the explanation described above, the forming method of the connector 10 of the present embodiment comprises the molding step, or molding the housing 20 of the resin which is put into the die 80 (see FIG. 6) while the terminal 30 is insert-molded in the housing 20, the resin being not put into the closed space 88.

Referring to FIG. 11, the connector 10 can be easily connected the object 70 merely by pressing the connector 10 against the object 70. However, when the connector 10 is used to transmit high-frequency signals, the terminals 30 should be extremely accurately positioned relative to the housing 20. If the terminals 30 are attached to the housing 20 by an attaching method such as press-fit or engagement, positional accuracy of the terminals 30 to the housing 20 might be degraded. When accuracy of positional relation between the housing 20 and the terminals 30 is insufficient, high-frequency characteristics of the terminals 30 might vary, and thereby designed characteristics could not be obtained.

In contrast, each of the terminals 30 of the present embodiment is insert-molded and partially embedded in the housing 20 made of resin. By fixing each of the terminals 30 to the housing 20 as described above, variation of positional relation between the housing 20 and the terminals 30 can be reduced.

Figure 9:
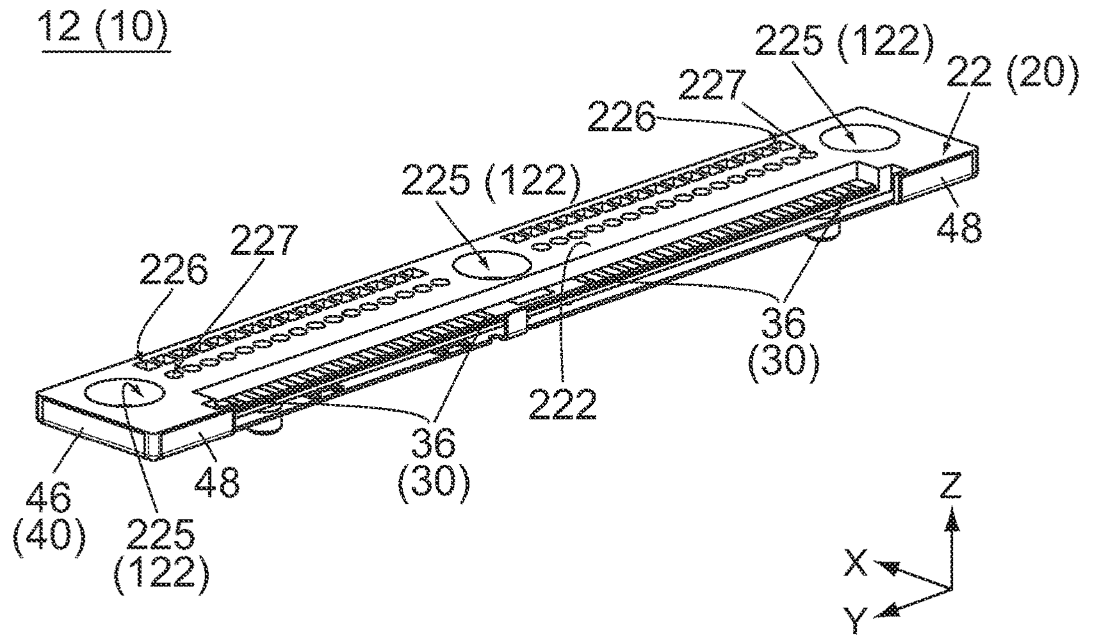
FIG. 9 is a perspective view showing the insert-molded body of the connector of FIG. 4.
Figure 12:
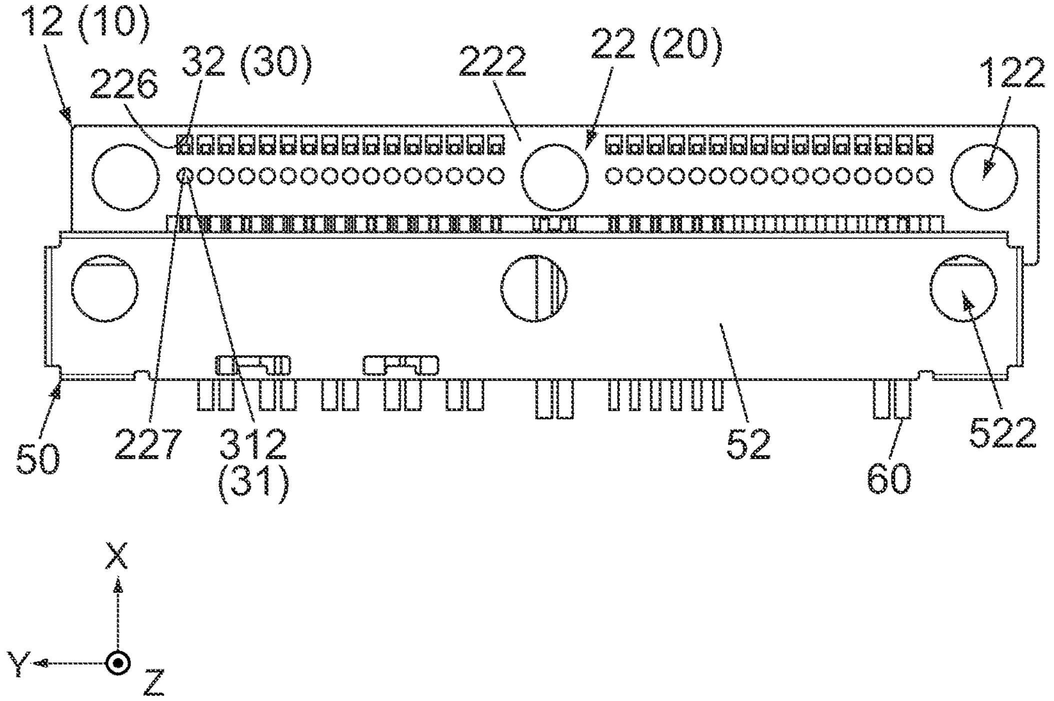
FIG. 12 is a top view showing the insert-molded body of FIG. 9 and a cover, wherein the insert-molded body is connected to the cables.
Figure 15:
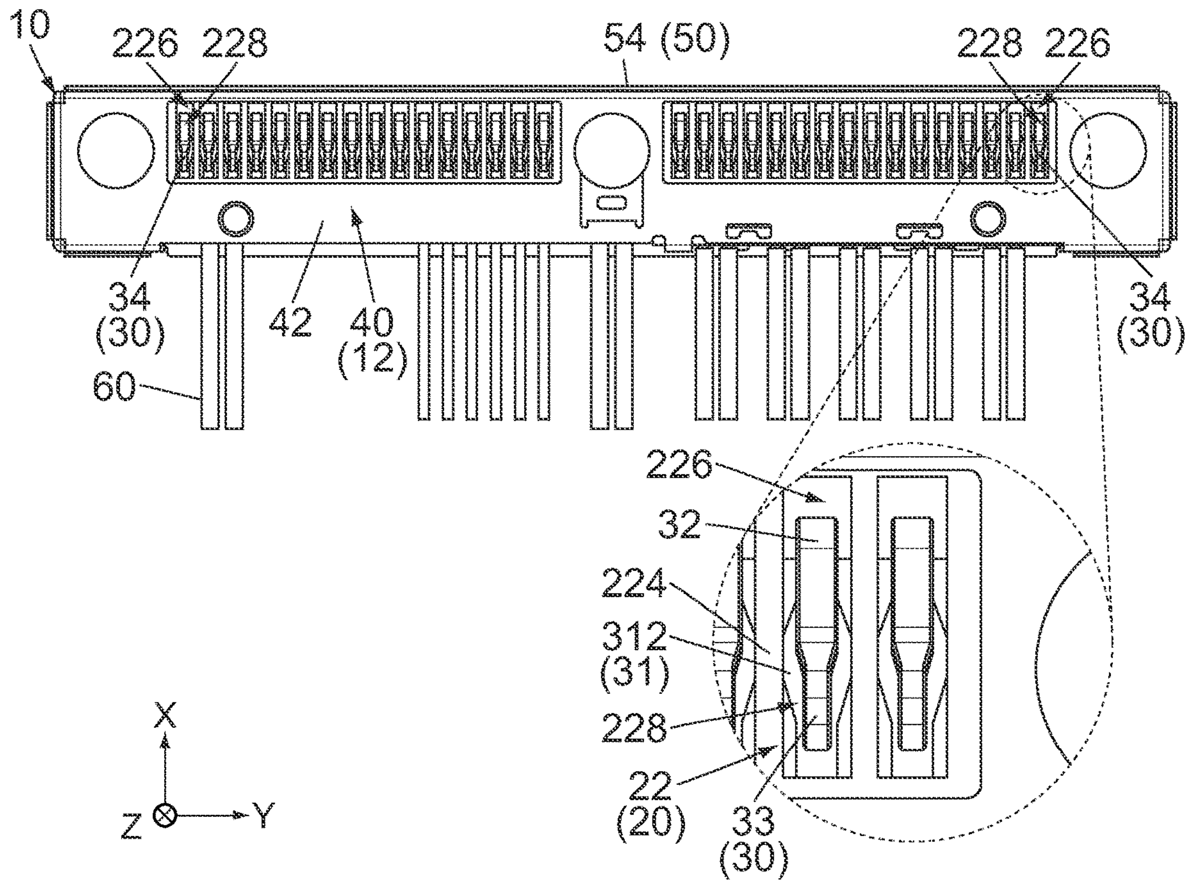
FIG. 15 is a bottom view showing the connector of FIG. 13, wherein a part of the connector enclosed by dashed line is enlarged and illustrated.
Figure 16:
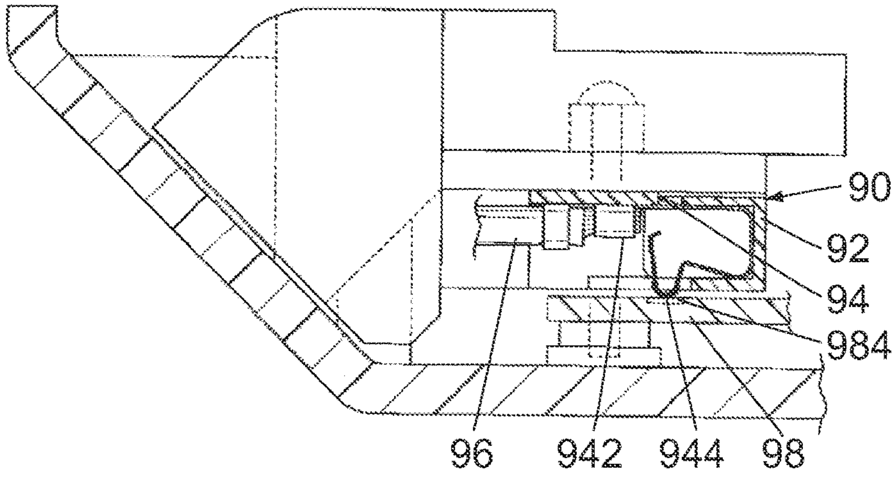
FIG.16 PRIOR ART
FIG. 16 is a cross-sectional view showing a connector of Patent Document 1.

Referring to FIG. 11 together with FIGS. 9, 12 and 15, the held portion 31 and the solderable portion 36 of each of the terminals 30 are fixed to the housing 20 so that their opposite sides in the lateral direction are in close contact with the housing 20. This structure prevents the terminals 30 from being displaced relative to the housing 20. In addition, the embedded portion 35 of each of the terminals 30 is in close contact with the housing 20 and is fixed to the housing 20 in a predetermined plane (YZ-plane) defined by the upper-lower direction and the lateral direction. This structure further securely prevents the displacement of the terminals 30 relative to the housing 20.

Referring to FIG. 11, when the spring length of the support portion 33 of the terminal 30 is made long in order to improve spring characteristics, the held portion 31 tends to be long. Such a long held portion 31 is plastically deformed easily when the terminal 30 is insert-molded into the housing 20. For example, during the injection of the resin in the molding step (see FIG. 5), the long held portion 31 is pushed by the resin and thereby might be plastically deformed into a waving shape while being embedded in the housing 20. As a result, positional relation between the housing 20 and each of the terminals 30 will be changed.

However, referring to FIG. 11 together with FIG. 7, the held portion 31 of the present embodiment has the wide portion 312 which protrudes beyond the support portion 33 in opposite orientations in the lateral direction. Even though the support portion 33 is located just under the held portion 31, the thus-provided wide portion 312 allows the lower die 84 to easily push the held portion 31 from below. When the terminal 30 is insert-molded into the housing 20, the plastic deformation of the held portion 31 can be reduced by vertically sandwiching and pressing the wide portion 312. Thus, the present embodiment provides the connector 10 (see FIG. 4) having a structure which can improve accuracy of positional relation between the housing 20 and each of the terminals 30. As described above, the connector 10 of the present embodiment is suitable for transmitting high-frequency signals. However, the present invention is not limited thereto, but the connector 10 may transmit only low-frequency signals.

Referring to FIG. 11 together with FIG. 8, in the arranging step (see FIG. 5) of the present embodiment, not only the held portion 31 of each of the terminals 30 but also the bent-back portion 32 is vertically sandwiched and fixed by the upper die 82 and the lower die 84. As a result, displacement and plastic deformation of each of the terminals 30 which might be caused during the injection of the resin can be more reliably prevented. In addition, the solderable portion 36 is pressed against the upper die 82 which is located over the solderable portion 36. As a result, displacement and plastic deformation of each of the terminals 30 which might be caused during the injection of the resin can be further reliably prevented. However, the present invention is not limited thereto. For example, the bent-back portion 32 may be fixed as necessary. Instead, the other portion of the terminal 30 may be vertically fixed in addition to the bent-back portion 32.

Referring to FIG. 11 together with FIG. 6, in the arranging step (see FIG. 5) of the present embodiment, not only the terminals 30 but also the insert-shell 40 is partially accommodated in the cavity 86. Therefore, the insert-shell 40 of the present embodiment is partially embedded in the molded housing 20. According to the present embodiment, the housing 20, the terminals 30 and the insert-shell 40 can be extremely accurately positioned to each other. In addition, the housing 20 can be securely reinforced by the insert-shell 40. However, the present invention is not limited thereto. For example, the insert-shell 40 may be press-fit into the housing 20 after the housing 20 is molded.

Hereafter, explanation will be made about the insert-molded body 12 formed by the aforementioned manufacturing steps.

Figure 10:
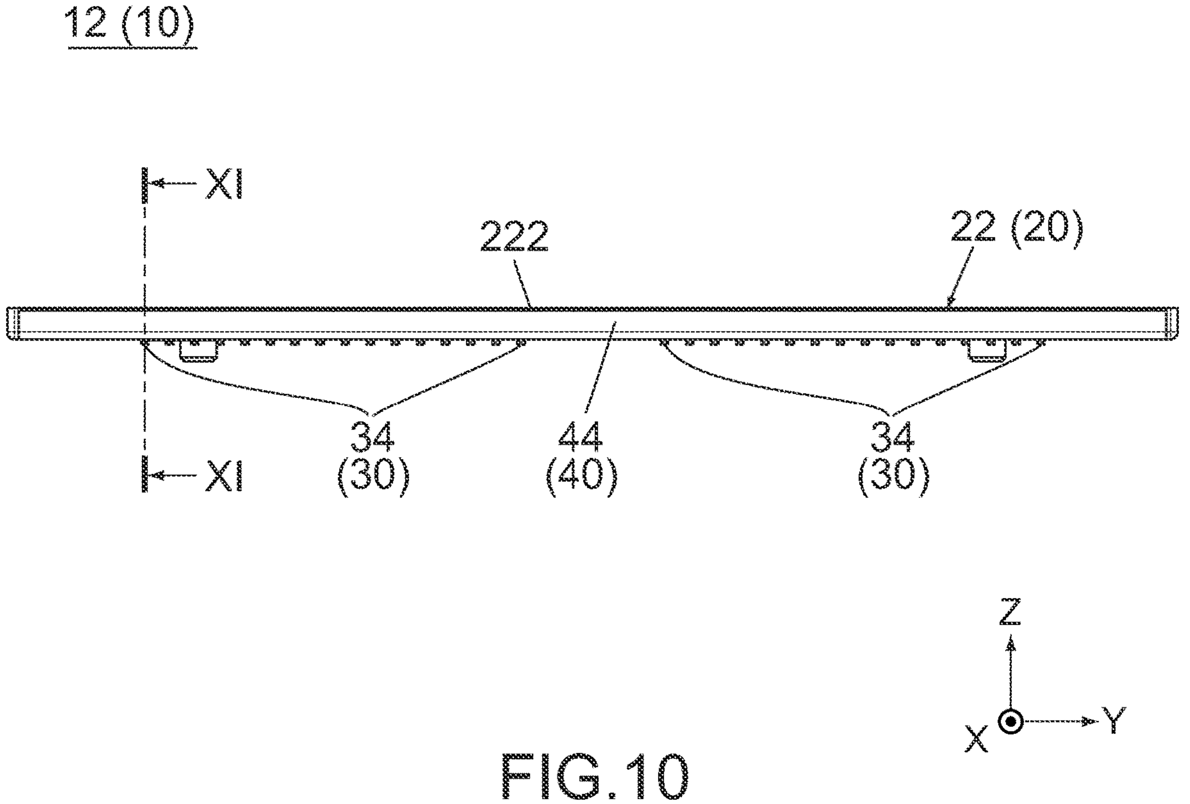
FIG. 10 is a front view showing the insert-molded body of FIG. 9.

Referring to FIGS. 9 to 11, the housing 20 of the insert-molded body 12 of the present embodiment has a main portion 22. According to the present embodiment, the most part of the housing 20 is the main portion 22. However, the present invention is not limited thereto. For example, the housing 20 may have various portions in addition to the main portion 22.

The main portion 22 has a flat-plate shape which is thin in the upper-lower direction and extends along the lateral direction across all the terminals 30. The main portion 22 has an upper surface 222 and a lower surface 224 in the upper-lower direction. Each of the upper surface 222 and the lower surface 224 extends along the XY-plane. Referring to FIG. 11 together with FIG. 2, the lower surface 224 of the main portion 22 is located on the upper surface 72 of the object 70 under a connected state where the connector 10 is pressed against the object 70 to be connected to the object

70. Thus, the lower surface 224 of the main portion 22 faces the object 70 when the connector 10 is connected to the object 70.

Referring to FIGS. 9, 11 and 15, the main portion 22 of the housing 20 is formed with a plurality of passing holes 226 which correspond to the terminals 30, respectively, a plurality of trace holes 227 which correspond to the terminals 30, respectively, and a plurality of accommodation spaces 228 which correspond to the terminals 30, respectively.

Referring to FIG. 11 together with FIG. 8, each of the trace holes 227 is a trace of the upper pressing portion 822 of the upper die 82 which is pulled out of the molded housing 20. Each of the trace holes 227 extends downward from the upper surface 222 of the main portion 22 to the wide portion 312 of the corresponding terminal 30. Each of the accommodation spaces 228 is a trace of the closed space 88 formed in the die 80 (see FIG. 6). Each of the accommodation spaces 228 is recessed upward from the lower surface 224 of the main portion 22 to the held portion 31 of the corresponding terminal 30.

Referring to FIG. 11, the support portion 33 of each of the terminals 30 is partially accommodated in the corresponding accommodation space 228. In detail, the support portion 33 of each of the terminals 30 is located in the corresponding accommodation space 228 except for a part thereof located in the vicinity of the contact portion 34. In particular, the end 332 of each of the support portions 33 is located in the corresponding accommodation space 228. This arrangement prevents damage of the terminal 30 which might be caused when the end 332 is brought into abutment with the other portion or the other member.

The contact portion 34 of each of the terminals 30 is exposed downward from the accommodation space 228 and projects downward from the insert-molded body 12. Each of the thus-arranged contact portions 34 is pressed against the corresponding conductive pad 74 when the connector 10 is pressed against the upper surface 72 of the object 70. In detail, upon pressing the connector 10 against the upper surface 72, each of the contact portions 34 is brought into contact with the corresponding conductive pad 74 with sufficient contact force while the support portion 33 is resiliently deformed.

The held portion 31 of each of the terminals 30 is held by the housing 20 so as to face, at least in part, the corresponding accommodation space 228. Referring to FIGS. 11 and 12, when the insert-molded body 12 is seen from above, the wide portion 312 of each of the held portions 31 is, at least in part, visible through the corresponding trace hole 227. Referring to FIG. 15, each of the wide portions 312 has the opposite sides in the lateral direction each of which protrudes beyond the support portion 33 in the lateral direction. Each of the wide portions 312 is partially visible through the accommodation space 228 when the insert-molded body 12 is seen from below.

Referring to FIG. 11 together with FIG. 8, each of the passing holes 226 is a trace of the upper die 82 and the lower die 84 which are pulled out of the molded housing 20. Referring to FIGS. 11 and 15, each of the passing holes 226 passes through the insert-molded body 12 in the upper-lower direction. The bent-back portion 32 of each of the terminals 30 is located in the corresponding passing hole 226.

In detail, referring to FIG. 11, each of the passing holes 226 passes through the main portion 22 from the upper surface 222 to the lower surface 224 and communicates with the accommodation space 228 in the front-rear direction. The bent-back portion 32 of each of the terminals 30 is located at the middle of the corresponding passing holes 226 in the upper-lower direction. Each of the bent-back portions 32 of the present embodiment is not embedded in the housing 20 and is resiliently deformable. According to the present embodiment, a spring length of the terminal 30 can be further made long. However, the present invention is not limited thereto. For example, each of the bent-back portions 32 may be embedded in and fixed to the housing 20.

Referring to FIGS. 4, 9, 10 and 15, the insert-shell 40 of the present embodiment is a single metal plate with bends and is partially embedded in the housing 20 to be fixed to the housing 20. The insert-shell 40 has a lower plate 42, a front plate 44, two side plates 46 and two rear plates 48. The lower plate 42, the front plate 44, the side plates 46 and the rear plates 48 are connected to each other. Each of the lower plate 42, the front plate 44, the side plates 46 and the rear plates 48 is partially embedded in the housing 20 to reinforce the housing 20.

Referring to FIGS. 11 and 15, the lower plate 42 covers the housing 20 from below while the passing holes 226 and the accommodation spaces 228 open downward. The lower plate 42 of the present embodiment has a lower surface which is flush with the lower surface 224 of the main portion 22 of the housing 20. The thus-embedded insert-shell 40 of the present embodiment is partially exposed from the lower surface 224 of the main portion 22.

Referring to FIG. 15 together with FIG. 11, the insert-shell 40 of the present embodiment surrounds the contact portions 34 of the terminals 30 in the XY-plane when the connector 10 is connected to the object 70. In detail, the lower plate 42 of the present embodiment is embedded in the lower surface 224 of the main portion 22 so as to seamlessly surround all the accommodation spaces 228 and all the passing holes 226 in the XY-plane. The thus-arranged lower plate 42 surrounds the contact portions 34 of all the terminals 30 in the XY-plane when the connector 10 is pressed against the object 70 to be connected to the object 70, and thereby the terminals 30 are electro-magnetically shielded in the XY-plane. Thus, the connector 10 of the present embodiment can reduce electro-magnetic interference (EMI).

Referring to FIGS. 10 and 11, the front plate 44 covers the housing 20 from the front substantially with no gap. Referring to FIGS. 4 and 9, the two side plates 46 covers opposite sides of the housing 20 in the lateral direction substantially with no gap. Referring to FIG. 9, the two rear plates 48 are located at opposite side of the insert-molded body 12 in the lateral direction, respectively. Each of the rear plates 48 covers the housing 20 from the behind. The connector 10 of the present embodiment has the insert-shell 40 which has the aforementioned structure and can more reliably reduce the EMI. However, the present invention is not limited thereto, but the structure of the insert-shell 40 can be modified as necessary.

Hereafter, explanation will be made about the connector 10 including the insert-molded body 12.

Referring to FIG. 4, the cables 60 are attached to the insert-molded body 12. In detail, referring to FIG. 11, the solderable portion 36 of each of the terminals 30 is configured to be soldered to the cable 60. Referring to FIG. 4 together with FIG. 11, the core wire 62 of each of the cables 60 is soldered to and fixed on the solderable portion 36.

If a part of the terminal 30 is crimped onto and fixed to the cable 60, each of the terminals 30 should be provided with a crimp portion which has a large size in the lateral direction. The thus-formed terminal 30 will have a large size in the lateral direction. In contrast, according to the present embodiment, since the terminal 30 does not need to be provided with such a crimp portion, each of the terminals 30 can be reduced in size in the lateral direction. In addition, a distance (pitch) between adjacent two of the terminals 30 in the lateral direction can be reduced. However, the present invention is not limited thereto. For example, each of the terminals 30 may have a crimp portion instead of the solderable portion 36 or may have a connection portion configured to be connected to a mating terminal (not shown) of the mating connector (not shown).

Referring to FIG. 11, the embedded portion 35 of each of the terminals 30 is entirely surrounded by the housing 20 in the YZ-plane. This structure prevents a movement of flux to the held portion 31 when the core wires 62 of the cables 60 are soldered. Moreover, the bent portion 352 of each of the terminals 30 is bent in the upper-lower direction. Thus, the solderable portion 36 and the held portion 31 of each of the terminals 30 are apart from each other in the upper-lower direction. More specifically, in each of the terminals 30 of the present embodiment, the held portion 31 is located above the solderable portion 36. This structure further securely prevents the movement of flux to the held portion 31. However, the present invention is not limited thereto. For example, the bent portion 352 may be provided as necessary.

Referring to FIG. 4, when the cables 60 are attached to the insert-molded body 12, the exposed shields 66 of the second cables 604 are fixed to each of the two ground plates 18 via soldering, etc. The core wires 62 of the second cables 604 are soldered to the solderable portions 36 (see FIG. 11) under a state where the shields 66 are vertically sandwiched and held between the two ground plates 18. The lower ground plate 18 is fixed to the insert-shell 40 via soldering, etc., and thereby the shields 66 of the second cables 604 are grounded to the insert-shell 40. The second cables 604 of the present embodiment are attached to the insert-molded body 12 as described above. However, an attaching method of the present invention for attaching the second cables 604 to the insert-molded body 12 is not specifically limited.

Figure 13:
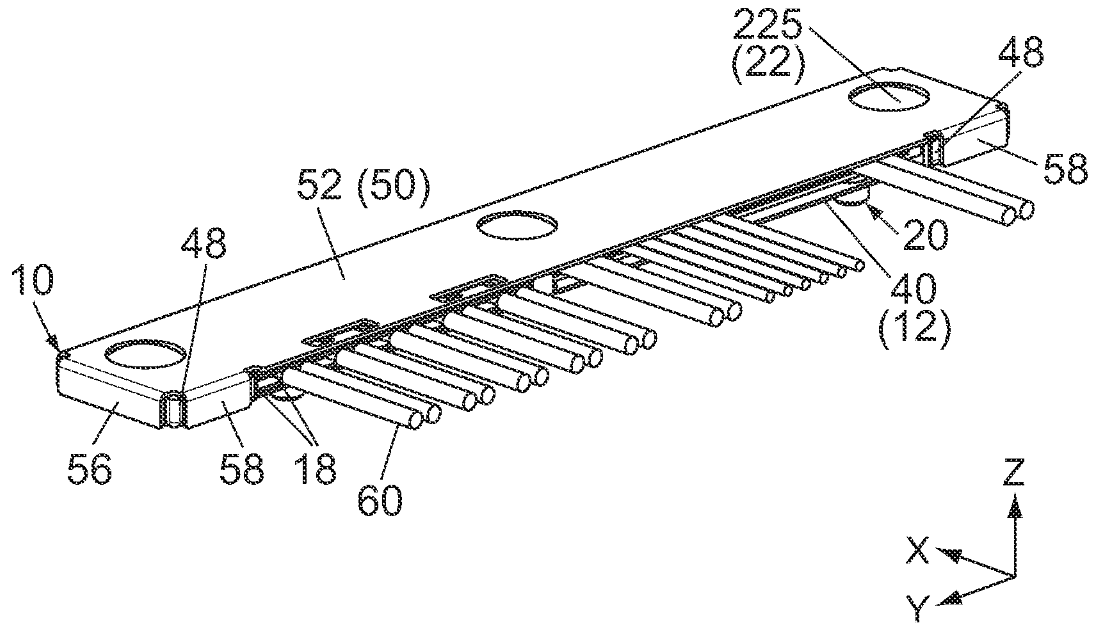
FIG. 13 is another perspective view showing the connector of FIG. 3.
Figure 14:
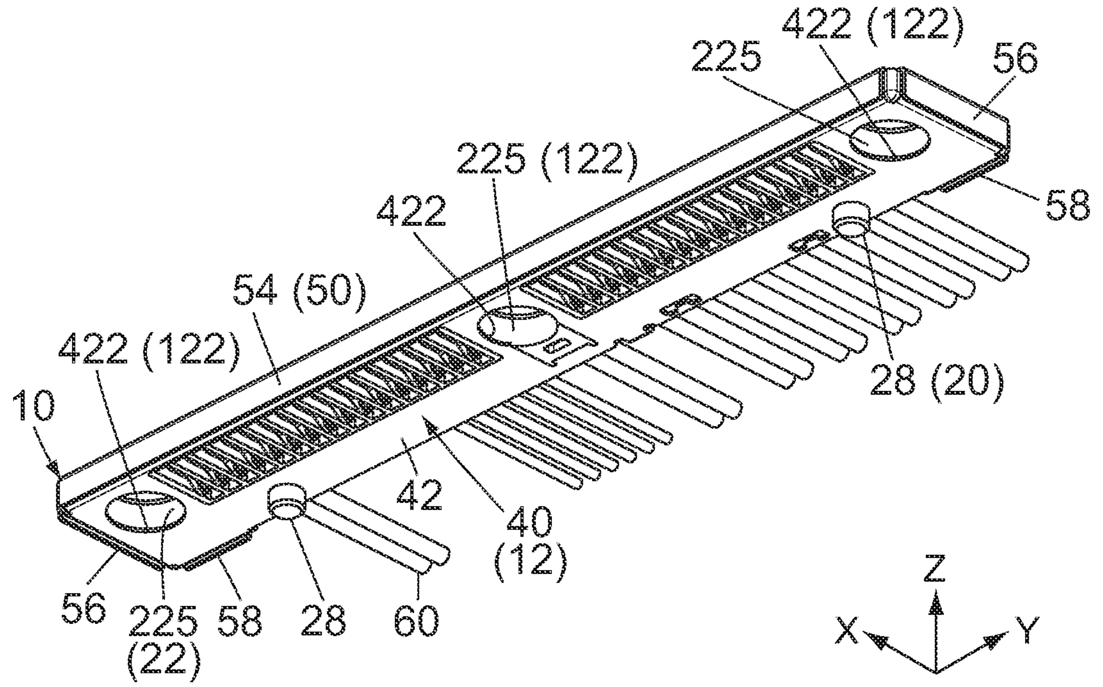
FIG. 14 is another perspective view showing the connector of FIG. 13.

Referring to FIG. 12, the cover 50 of the present embodiment is attached to the insert-molded body 12 to which the cables 60 have been fixed. Referring to FIGS. 12 to 14, the cover 50 of the present embodiment is a single metal plate with bends and is fixed to the insert-shell 40 via soldering, etc. The cover 50 has an upper plate 52, a front plate 54, two side plates 56 and two rear plates 58. The upper plate 52, the front plate 54, the side plates 56 and the rear plates 58 are connected to each other. Referring to FIGS. 4 and 13, when the cover 50 is attached to the insert-molded body 12, the upper plate 52 is brought into contact with the upper ground plate 18.

Referring to FIGS. 4 and 12, the cover 50 covers, at least in part, the upper surface 222 of the insert-molded body 12. In detail, the upper plate 52 of the cover 50 covers the upper surface 222 of the main portion 22 of the housing 20 from above substantially with no gap. Referring to FIGS. 13 and 14, the housing 20 is vertically covered by the insert-shell 40 and the cover 50 to be electro-magnetically shielded.

Referring to FIGS. 3 and 4, the front plate 54 covers the front plate 44 of the insert-shell 40 from the front substantially with no gap. The two side plates 56 covers side surfaces of the two side plates 46 of the insert-shell 40, respectively, in the lateral direction substantially with no gap. Referring to FIG. 13, the two rear plates 58 covers the two rear plates 48 of the insert-shell 40, respectively, from the behind substantially with no gap. Referring to FIG. 1 together with FIG. 11, when the connector 10 is pressed against the object 70 to be connected to the object 70, the contact portions 34 are located inside the insert-shell 40 and the cover 50 in the XY-plane.

The cover 50 of the present embodiment reinforces the housing 20 together with the insert-shell 40. In addition, the cover 50 electro-magnetically shields the terminals 30 in the XY-plane together with the insert-shell 40. Thus, the connector 10 of the present embodiment can more effectively reduce the EMI. However, the present invention is not limited thereto. For example, the structure of the cover 50 can be modified as necessary.

Referring to FIG. 1, the connector 10 of the present embodiment is fixed to the object 70 as described below.

Referring to FIG. 14 together with FIG. 2, the housing 20 has two positioning portions 28 which correspond to the two positioning holes 78 of the object 70, respectively. Referring to FIGS. 2 and 14, first, the positioning portions 28 are inserted into the positioning holes 78, respectively, so that the connector 10 is positioned to the object 70. Then, the connector 10 is pressed against the object 70 to be connected to the object 70.

Referring to FIG. 9, the main portion 22 of the housing 20 of the present embodiment is formed with three fixing holes 225. The fixing holes 225 are arranged in the lateral direction and pass through the main portion 22 in the upper-lower direction. Referring to FIG. 14, the lower plate 42 of the insert-shell 40 of the present embodiment is formed with three fixing holes 422 which correspond to the three fixing holes 225 of the housing 20, respectively. Each of the fixing holes 422 is located under the corresponding fixing hole 225 and passes through the lower plate 42 in the upper-lower direction. Each of the fixing holes 225 forms a first hole 122 together with the corresponding fixing hole 422. Thus, the insert-molded body 12 of the present embodiment is formed with three of the first holes 122. Each of the first holes 122 passes through the insert-molded body 12 in the upper-lower direction.

Referring to FIGS. 3 and 4, the cover 50 of the present embodiment is formed with three second holes 522 which correspond to the three first holes 122 of the insert-molded body 12, respectively. Each of the second holes 522 is located over the corresponding first hole 122 and passes through the cover 50 in the upper-lower direction. Thus, the second holes 522 correspond to the first holes 122 in the XY-plane, respectively.

Referring to FIGS. 1 and 2, the three screws 79 correspond to the first holes 122, respectively, and correspond to the second holes 522, respectively. The three screws 79 correspond to the screw holes 76 of the object 70. After the connector 10 is pressed against the object 70 to be connected to the object 70, each of the screws 79 is screwed into the corresponding screw hole 76 of the object 70 through the corresponding first hole 122 and the corresponding second hole 522. As a result, the connector 10 is securely fixed to the object 70.

As described above, when the connector 10 of the present embodiment is used, the connector 10 is positioned by the positioning portions 28 (see FIG. 14) and the positioning holes 78 and thereafter screwed to the object 70 with the screws 79 inserted into the first holes 122 and the second holes 522. However, a fixing method of the present invention for fixing the connector 10 to the object 70 is not specifically limited.

Referring to FIGS. 1, 2 and 15, when the connector 10 is fixed to the object 70, the lower plate 42 of the insert-shell 40 is pressed against and grounded to the ground pattern 75 of the object 70. At that time, the lower plate 42 and the ground pattern 75 seamlessly surround the contact portions 34 of all the terminals 30 and all the conductive pads 74 in the XY-plane. In addition, referring to FIG. 4 together with FIG. 2, the shields 66 of the second cables 604 are grounded to the object 70 through the ground plates 18, the insert-shell 40 and the cover 50. According to the aforementioned structure, the connector 10 can more securely reduce the EMI.

However, the present invention is not limited thereto. For example, the ground pattern 75 of the object 70 may be provided as necessary.

What is claimed is:

1. A connector configured to be pressed against an object to be connected to the object, wherein:
the connector comprises an insert-molded body;
the insert-molded body comprises a housing made of resin and a terminal;
the terminal is partially embedded in the housing;
the housing has a main portion;
the main portion has an upper surface and a lower surface in an upper-lower direction;
the lower surface of the main portion faces the object when the connector is connected to the object;
the main portion is formed with a trace hole and an accommodation space;
the trace hole extends downward from the upper surface of the main portion;
the accommodation space is recessed upward from the lower surface of the main portion;
the terminal has a held portion, a bent-back portion, a support portion and a contact portion;
the held portion extends in a front-rear direction perpendicular to the upper-lower direction and is held by the housing so as to face, at least in part, the accommodation space;
the held portion has a wide portion;
when the insert-molded body is seen from above, the wide portion is, at least in part, visible through the trace hole;
the bent-back portion extends forward from the held portion;
the support portion extends rearward from the bent-back portion and is resiliently deformable;
the contact portion is supported by the support portion;
the support portion and the contact portion are located under the held portion;
each of the support portion and the contact portion has a size smaller than that of the wide portion in a lateral direction perpendicular to both the front-rear direction and the upper-lower direction;
the support portion is partially accommodated in the accommodation space;
the wide portion has opposite sides in the lateral direction each of which protrudes beyond the support portion in the lateral direction; and
the wide portion is partially visible through the accommodation space when the insert-molded body is seen from below.

2. The connector as recited in claim 1, wherein:
the connector is connectable to a cable;
the terminal has a solderable portion and an embedded portion;
the solderable portion is configured to be soldered to the cable; and
the embedded portion is located between the solderable portion and the held portion and is entirely surrounded by the housing in a plane defined by the upper-lower direction and the lateral direction.

3. The connector as recited in claim 2, wherein:
the embedded portion has a bent portion;
the bent portion is bent in the upper-lower direction; and
the solderable portion and the held portion are apart from each other in the upper-lower direction.

4. The connector as recited in claim 1, wherein the support portion has an end which is a free end and is located in the accommodation space.

5. The connector as recited in claim 1, wherein;
the housing is formed with a passing hole;
the passing hole passes through the main portion from the upper surface to the lower surface and communicates with the accommodation space; and
the bent-back portion is located in the passing hole.

6. The connector as recited in claim 1, wherein;
the insert-molded body comprises an insert-shell made of metal; and
the insert-shell is partially embedded in the housing and is partially exposed from the lower surface of the main portion.

7. The connector as recited in claim 6, wherein the insert-shell surrounds the contact portion in a horizontal plane perpendicular to the upper-lower direction when the connector is connected to the object.

8. The connector as recited in claim 1, wherein;
the connector comprises a cover made of metal; and
the cover covers, at least in part, an upper surface of the insert-molded body.

9. The connector as recited in claim 8, wherein;
the insert-molded body is formed with a first hole;
the cover is formed with a second hole;
the second hole corresponds to the first hole in a horizontal plane perpendicular to the upper-lower direction; and
the connector is screwed to the object with a screw inserted into the first hole and the second hole when the connector is used.

* * * * *